(12) United States Patent
Joe

(10) Patent No.: US 11,172,789 B2
(45) Date of Patent: Nov. 16, 2021

(54) SCOOPING DEVICE

(71) Applicant: Mitchell Leighton Joe, Mill Valley, CA (US)

(72) Inventor: Mitchell Leighton Joe, Mill Valley, CA (US)

(*) Notice: Subject to any disclaimer, the term of this patent is extended or adjusted under 35 U.S.C. 154(b) by 0 days.

(21) Appl. No.: 17/071,824

(22) Filed: Oct. 15, 2020

(65) Prior Publication Data

US 2021/0113026 A1 Apr. 22, 2021

Related U.S. Application Data

(60) Provisional application No. 62/916,870, filed on Oct. 18, 2019.

(51) Int. Cl.
*A47J 43/28* (2006.01)
*A47F 13/08* (2006.01)

(52) U.S. Cl.
CPC .............. *A47J 43/288* (2013.01); *A47F 13/08* (2013.01)

(58) Field of Classification Search
CPC ........ A47J 43/288; A47J 43/283; A47J 43/28; A47J 43/00; A47F 13/08
USPC .......... 294/7, 8, 176, 178, 180, 212; 30/169; D8/10
See application file for complete search history.

(56) References Cited

U.S. PATENT DOCUMENTS

| | | | | |
|---|---|---|---|---|
| 1,367,032 A | * | 2/1921 | Ferdon | A47J 43/288 30/136 |
| D57,649 S | * | 4/1921 | Hines | |
| 1,375,399 A | * | 4/1921 | Leonard | A47J 43/28 241/95 |
| 1,704,329 A | * | 3/1929 | Klaus | A47L 13/08 15/236.07 |
| 2,613,977 A | * | 10/1952 | Kellogg | A47J 43/288 294/49 |
| 4,088,360 A | * | 5/1978 | Jenkins | A47J 43/283 294/8 |
| 4,245,411 A | * | 1/1981 | McMath | E01H 5/02 294/176 |
| 4,890,549 A | * | 1/1990 | Steiner | A47G 21/001 24/487 |
| D472,112 S | * | 3/2003 | Bertke | D7/691 |
| 6,733,056 B2 | * | 5/2004 | Daniele | A47F 13/08 294/180 |
| D519,794 S | * | 5/2006 | Roberts | D8/10 |
| D599,628 S | * | 9/2009 | Pourounidis | D7/691 |
| 2004/0104587 A1 | * | 6/2004 | Roberts | A47J 43/28 294/176 |

* cited by examiner

*Primary Examiner* — Paul T Chin

(74) *Attorney, Agent, or Firm* — Kali Law Group, P.C.

(57) ABSTRACT

Scooping devices are presented including: a scoop forming a planar top surface and a bottom surface, the scoop defining a leading edge, a trailing edge, a proximate edge, and a distal edge, where the bottom surface includes a grooved hinge that extends from the leading edge to the trailing edge; a proximate handle portion located along the trailing edge, the proximate handle portion forming a cavity and extending inward from a raised edge adjacent to the proximate edge; a distal handle portion located along the trailing edge, the distal handle portion forming a cavity and extending inward from a raised edge adjacent to the distal edge, where a gap is formed between the proximate handle portion and the distal handle portion; and a flexible handle wrap.

16 Claims, 8 Drawing Sheets

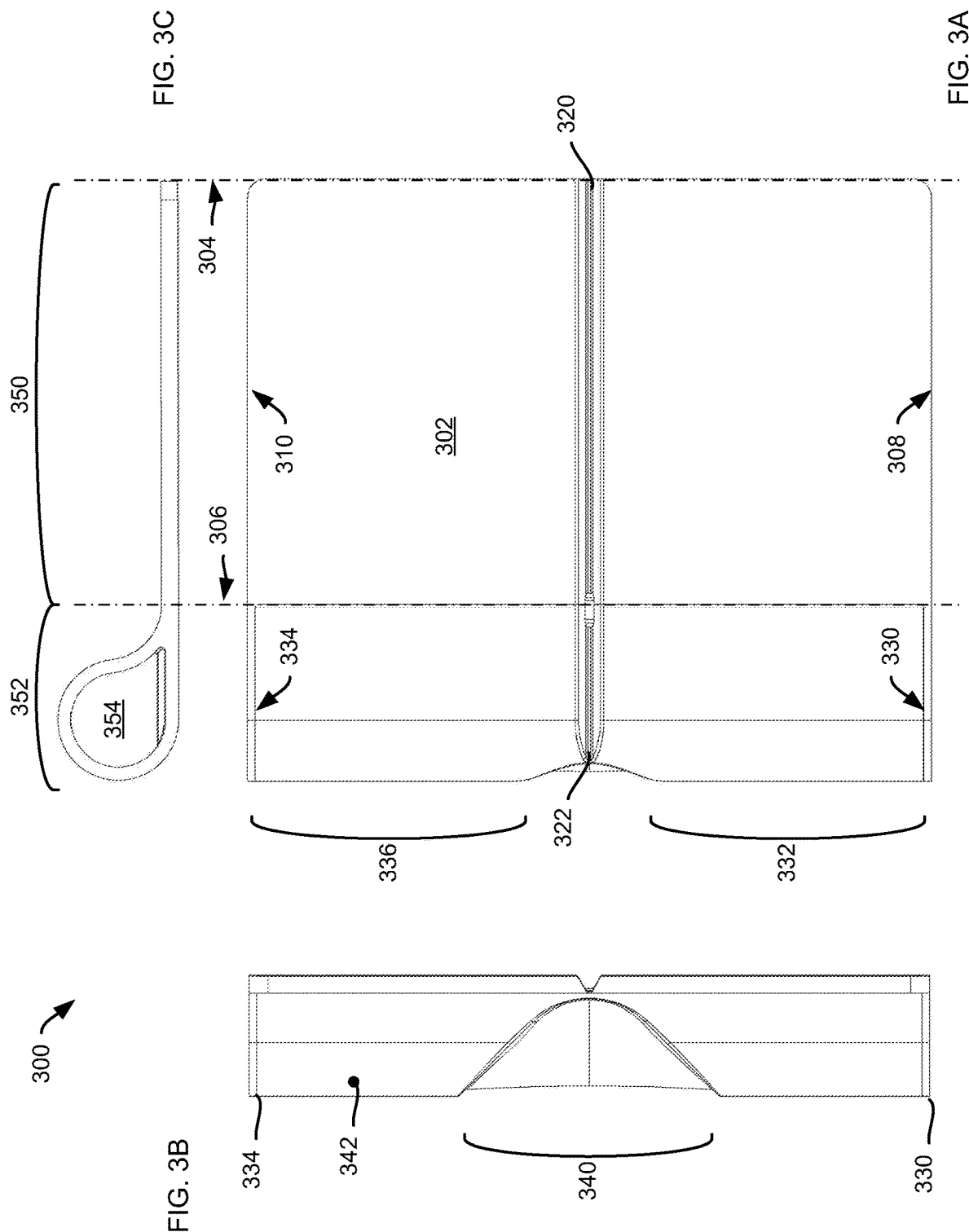

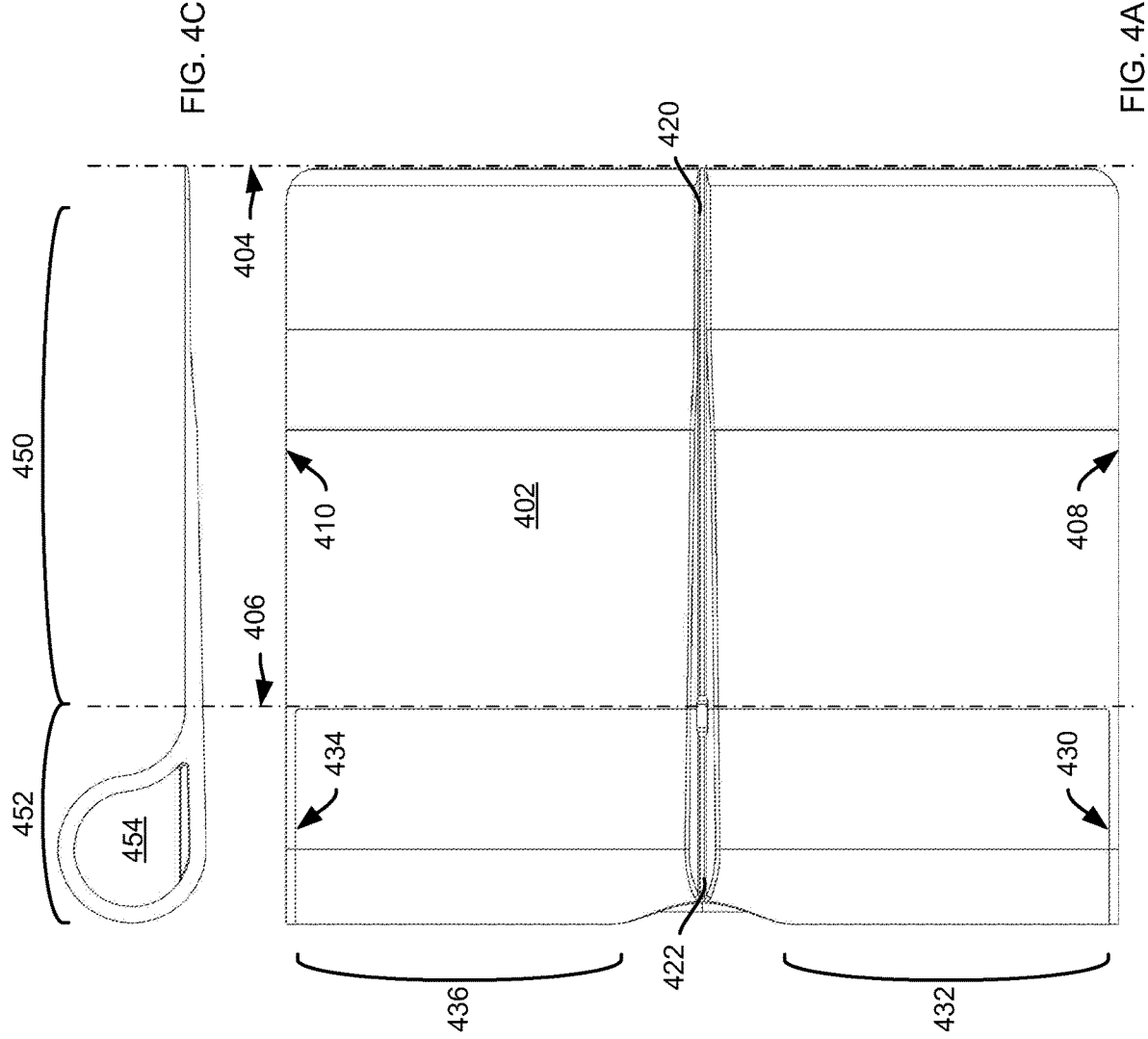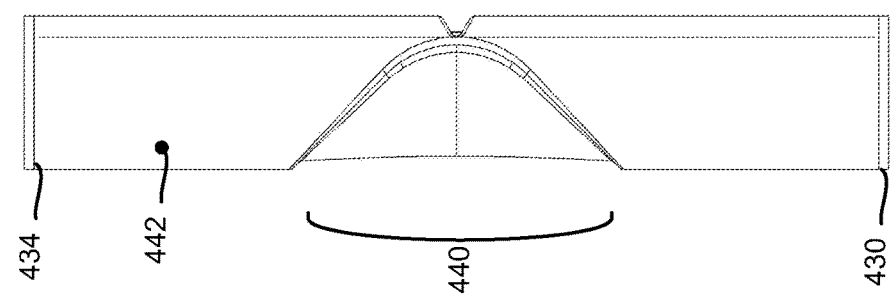

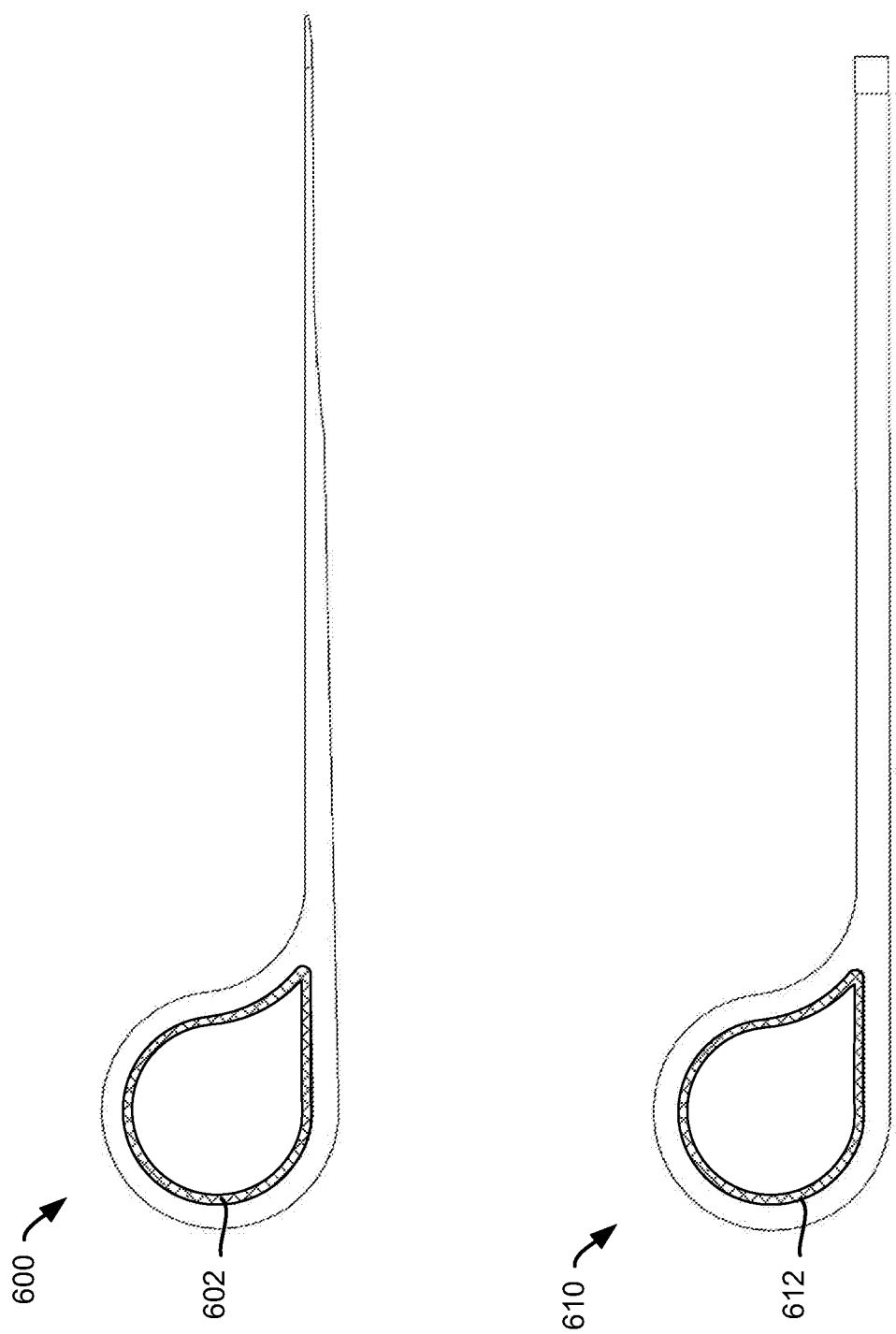

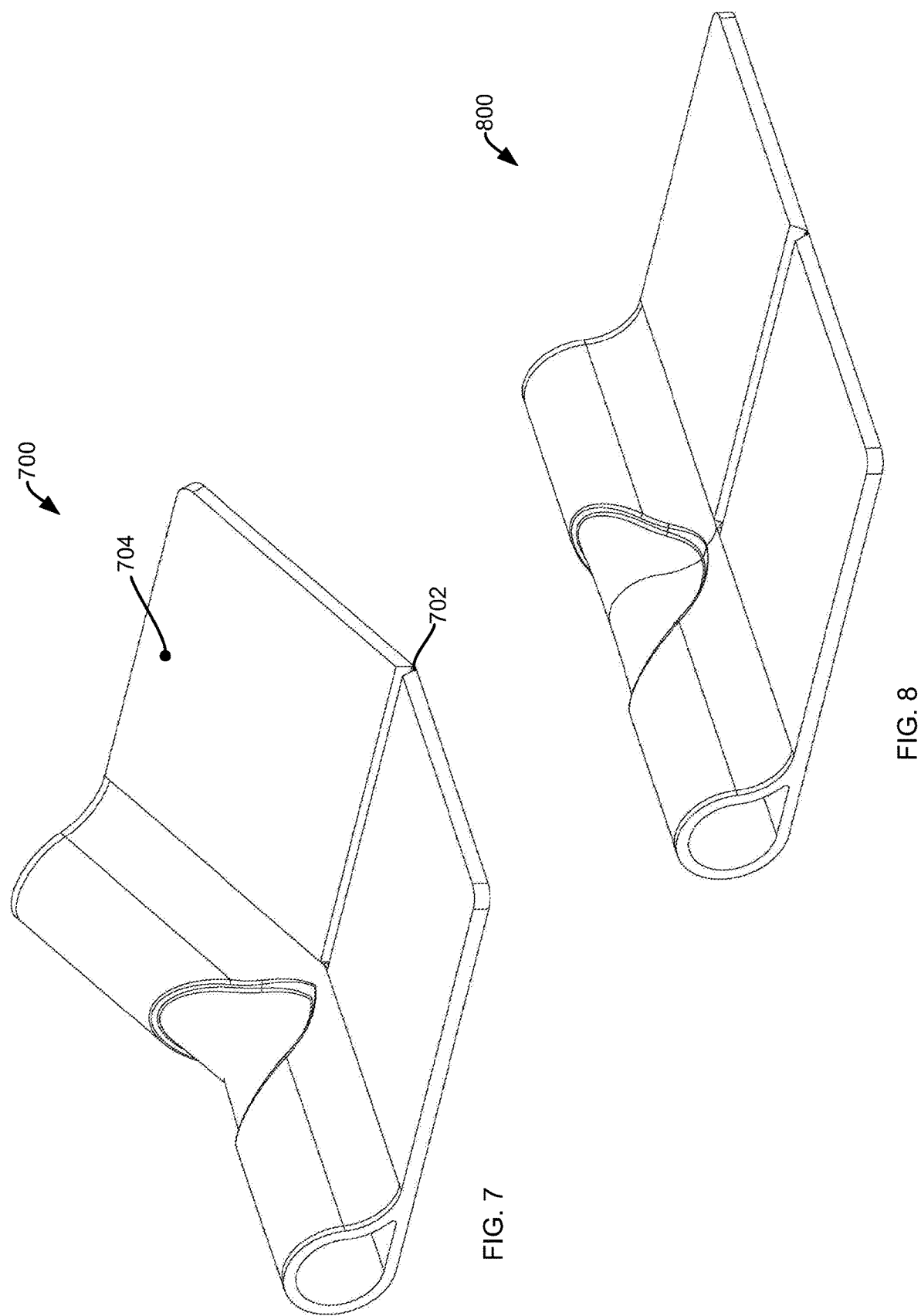

SCOOPING DEVICE

BACKGROUND

Efficient and effective food preparation requires a myriad of tools. One critical tool in the culinary arts is the cutting board. A cutting board provides a surface for cutting and chopping that does not dull a kitchen knife or chopping tool. The cutting board also provides a convenient way to transport prepared ingredients to another vessel or surface. However, transferring ingredients can be challenging as the ingredients may be spread all over the cutting board making transfers to pots or bowls difficult. The common options are to (a) use hands to pick up the food, (b) use one hand and a knife to pick up the food, and (c) lift up the cutting board and scrape the food off with a knife or a hand. Options (a) and (b) may dirty the hands which may require a subsequent rinse. Option (c) may, at times, miss the target if the target is a small bowl, which may require subsequent clean-up. It may be advantageous to avoid additional rinsing and cleaning steps when preparing food.

As such, scooping devices are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, scooping devices are presented including: a scoop forming a planar top surface and a bottom surface, the scoop defining a leading edge, a trailing edge, a proximate edge, and a distal edge, where the bottom surface includes a grooved hinge that extends from the leading edge to the trailing edge; a proximate handle portion located along the trailing edge, the proximate handle portion forming a cavity and extending inward from a raised edge adjacent to the proximate edge; a distal handle portion located along the trailing edge, the distal handle portion forming a cavity and extending inward from a raised edge adjacent to the distal edge, where a gap is formed between the proximate handle portion and the distal handle portion; and a flexible handle wrap, the flexible handle wrap forming a layer extending from the trailing edge of the substantially planar top surface to the trailing edge of the bottom surface thereby enclosing at least a portion of the proximate handle, the distal handle, and the gap, where the flexible handle wrap further includes a second grooved hinge extending from the trailing edge along a bottom portion of the flexible handle wrap, the first grooved hinge and the second grooved hinge forming a continuous hinge. In some embodiments, the bottom surface is tapered from the trailing edge to the leading edge. In some embodiments, the grooved hinge widens from the leading edge to the trailing edge. In some embodiments, the grooved hinges form a shape such as: a vee-groove, a squared groove, and a rounded groove. In some embodiments, the flexible handle wrap further includes a textured surface. In some embodiments, further includes a semi-ovate depression that defines the gap. In some embodiments, scooping devices further include: a metal edge extending from the leading edge, the metal edge including a break line aligned with the first grooved hinge and separating a proximate metal edge portion and a distal metal edge portion. In some embodiments, the planar top surface includes a grooved hinge that extends from the leading edge to the trailing edge.

In other embodiments, scooping devices include: a scoop forming a planar top surface and a bottom surface, the scoop defining a leading edge, a trailing edge, a proximate edge, and a distal edge, where the planar top surface includes a grooved hinge that extends from the leading edge to the trailing edge; a proximate handle portion located along the trailing edge, the proximate handle portion forming a cavity and extending inward from a raised edge adjacent to the proximate edge; a distal handle portion located along the trailing edge, the distal handle portion forming a cavity and extending inward from a raised edge adjacent to the distal edge, where a gap is formed between the proximate handle portion and the distal handle portion; and a flexible handle wrap, the flexible handle wrap forming a layer extending from the trailing edge of the planar top surface to the trailing edge of the bottom surface thereby enclosing at least a portion of the proximate handle, the distal handle, and the gap. In some embodiments, the flexible handle wrap further includes a grooved hinge extending from the trailing edge along a bottom portion of the flexible handle wrap, and the bottom surface includes a grooved hinge that extends from the leading edge to the trailing edge.

In other embodiments, scooping devices include: a scoop forming a planar top surface, a bottom surface, a leading edge, a trailing edge, a proximate edge, and a distal edge, where the bottom surface includes a grooved hinge that extends from the leading edge to the trailing edge; a proximate handle portion located along the trailing edge, the proximate handle portion forming a cavity and extending inward from the proximate edge; a distal handle portion located along the trailing edge, the distal handle portion forming a cavity and extending inward from the distal edge where a gap is formed between the proximate handle portion and the distal handle portion; and a flexible handle core, the flexible handle core forming a layer along an interior surface of the cavities extending from the proximate edge of the proximate handle portion to the distal edge of the distal handle portion thereby bridging the gap.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A-3C are illustrative representations of a scooping device in accordance with embodiments of the present invention;

FIGS. 4A-4C are illustrative representations of a scooping device in accordance with embodiments of the present invention;

FIG. 6 is an illustrative representation of scooping devices in accordance with embodiments of the present invention;

FIG. 7 is an illustrative representation of a scooping device in accordance with embodiments of the present invention;

FIG. 8 is an illustrative representation of a scooping device in accordance with embodiments of the present invention;

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as a "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 1:
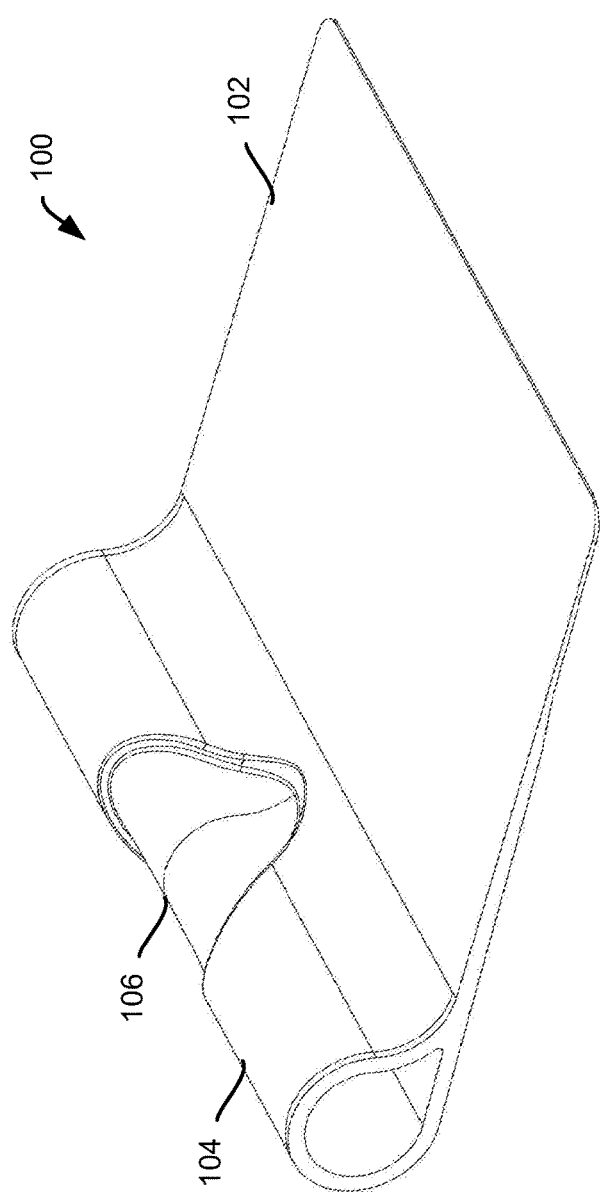
FIG. 1 is an illustrative representation of a scooping device in accordance with embodiments of the present invention.

FIG. 1 is an illustrative representation of scooping device 100 in accordance with embodiments of the present invention. As illustrated, scooping device 100 includes base or scoop 102 that forms a substantially planar top surface. Scooping device 100 further includes handle portion 104 for holding the scooping device with a hand. In embodiments, the handle portion includes a semi-ovate depression 106 that may be depressed when folding the scooping device. As illustrated, scooping device is in the flattened position. In this position, the scooping device may be used to gather or scoop ingredients. In a cutting board embodiment, the scooping device may be used to cut on or chop on in the flattened position as disclosed for FIGS. 3A-3C below.

Figure 2:
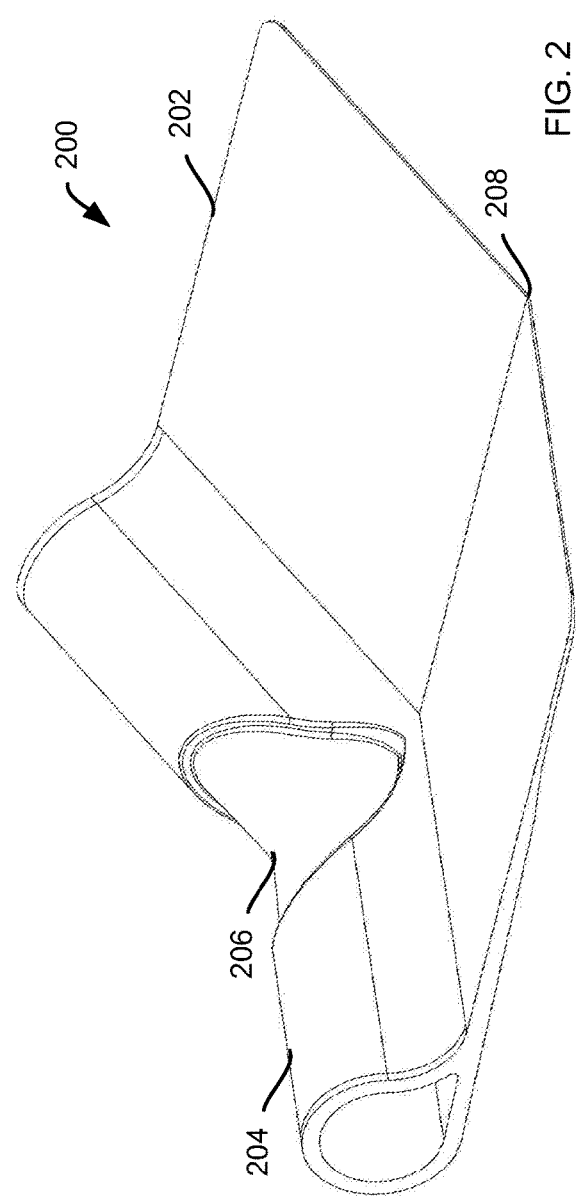
FIG. 2 is an illustrative representation of a scooping device in accordance with embodiments of the present invention.

FIG. 2 is an illustrative representation of scooping device 200 in accordance with embodiments of the present invention. In the illustrated embodiment, scooping device 200 is in the semi-folded position. As illustrated, scooping device 200 includes base or scoop 202 that is folded along grooved hinge 208. As illustrated, scooping device 200 further includes handle portion 204 for holding the scooping device with a hand. In embodiments, the handle portion includes a semi-ovate depression 206 that is partially depressed to transition the scooping device into the semi-folded position illustrated. By folding the scooping device, ingredients may be channeled to the center of the scoop thus directing the ingredients effectively and efficiently into a container or cooking vessel with no need to use a hand or knife.

FIGS. 3A-3C are illustrative representations of scooping device 300 in accordance with embodiments of the present invention. In particular, FIG. 3A is an illustrative bottom view of scooping device 300; FIG. 3B is an illustrative back view of scooping device 300; and FIG. 3C is an illustrative side view of scooping device 300. The various illustrated views are intended to provide clarity in disclosing embodiments of the present invention and will be referenced together. As illustrated, scooping device 300 includes scoop 350 that forms a substantially planar top surface (see FIG. 1), and bottom surface 302. Scoop 350 defines a leading edge as indicated by line 304; a trailing edge as indicated by line 306; a proximate edge 310; and a distal edge 308. In some embodiments, the leading edge includes rounded corners. Bottom surface 302 further includes grooved hinge 320 that extends from the leading edge to the trailing edge and continues along handle 352 as indicated by 322. In some grooved hinge embodiments, the grooved hinge forms a shape such as a vee-groove, a squared groove, and a rounded groove without limitation. In embodiments, scoops may be manufactured from a polypropylene material. Polypropylene, also known as polypropene, is a thermoplastic polymer used in a wide variety of applications. It is produced via chain-growth polymerization from the monomer propylene. Polypropylene belongs to the group of polyolefins and is partially crystalline and non-polar. In addition, scoop embodiments may be dimensioned in accordance with intended use. For example, scoop embodiments may be up to approximately 10.00 inches in length and up to approximately 10.00 inches in width without limitation. In a preferred embodiment, the length is approximately 4.75 inches and the width is approximately 7.00 inches. In the illustrated embodiment, the scoop has a uniform thickness across length and width and may be sized in accordance with intended use. For example, scoop embodiments may have a uniform thickness of up to approximately 0.50 inches without limitation. In a preferred embodiment, the thickness is approximately 0.125 inches.

Further illustrated is proximate handle portion 336 located along the trailing edge as indicated by line 306. Proximate handle portion 336 forms cavity 354 and extends inward from raised edge 334 adjacent to proximate edge 310 toward grooved hinge 322. Still further illustrated is distal handle portion 332 located along the trailing edge as indicated by line 306. Distal handle portion 332 forms cavity 354 and extends inward from raised edge 330 adjacent to distal edge 308 toward grooved hinge 322. Gap 340 is formed between the proximate handle portion and the distal handle portion.

In embodiments, the proximate handle portion, the distal handle portion, and the gap are covered by flexible handle wrap 342. As illustrated, flexible handle wrap 342 forms a layer extending from the trailing edge as indicated by line 306 of the top surface to the trailing edge of the bottom surface thereby enclosing at least a portion of proximate handle 336, distal handle 332, and gap 340 and includes grooved hinge 322 extending from the trailing edge along a bottom portion of the flexible handle wrap as indicated above. In embodiments, the flexible handle wrap is constrained by raised edge 334 and raised edge 330. In addition, in embodiments, the flexible handle wrap includes a semi-ovate depression as shown that defines gap 340. In embodiments, flexible handles wraps may be manufactured from a thermoplastic elastomer. Thermoplastic elastomers, sometimes referred to as thermoplastic rubbers, are a class of copolymers or a physical mix of polymers that consist of materials with both thermoplastic and elastomeric properties. In some embodiments, the thermoplastic elastomer may include a surface texture to aid in gripping the handle. Surface textures are well-known in the art and one skilled in the art will readily understand the application of a surface texture to increase grip. In addition, handle 352 embodiments may be dimensioned in accordance with intended use. For example, handle embodiments may be up to approximately 2.50 inches in height without limitation.

FIGS. 4A-4C are illustrative representations of scooping device 400 in accordance with embodiments of the present invention. In particular, FIG. 4A is an illustrative bottom view of scooping device 400; FIG. 4B is an illustrative back view of scooping device 400; and FIG. 4C is an illustrative side view of scooping device 400. The various illustrated views are intended to provide clarity in disclosing embodiments of the present invention and will be referenced together. As illustrated, scooping device 400 includes scoop 450 that forms a substantially planar top surface (see FIG. 1), and bottom surface 402. Scoop 450 defines a leading edge as indicated by line 404; a trailing edge as indicated by line 406; a proximate edge 410; and a distal edge 408. In some embodiments, the leading edge includes rounded corners. Bottom surface 402 further includes grooved hinge 420 that extends from the leading edge to the trailing edge and continues along handle 452 as indicated by 422. In some grooved hinge embodiments, the grooved hinge forms a shape such as a vee-groove, a squared groove, and a rounded groove without limitation. In embodiments, scoops may be manufactured from a polypropylene material. Polypropylene, also known as polypropene, is a thermoplastic polymer used in a wide variety of applications. It is produced via chain-growth polymerization from the monomer propylene. Polypropylene belongs to the group of polyolefins and is partially crystalline and non-polar. In addition, scoop embodiments may be dimensioned in accordance with intended use. For example, scoop embodiments may be up to approximately 10.00 inches in length and up to approximately 10.00 inches in width without limitation. In a preferred embodiment, the length is approximately 4.75 inches and the width is approximately 7.00 inches. In the illustrated embodiment, the scoop has a uniform thickness across length and width and may be sized in accordance with intended use. For example, scoop embodiments may have a uniform thickness of up to approximately 0.50 inches without limitation. In a preferred embodiment, the thickness is approximately 0.125 inches.

Further illustrated is proximate handle portion 436 located along the trailing edge as indicated by line 406. Proximate handle portion 436 forms cavity 454 and extends inward from raised edge 434 adjacent to proximate edge 410 toward grooved hinge 422. Still further illustrated is distal handle portion 432 located along the trailing edge as indicated by line 406. Distal handle portion 432 forms cavity 454 and extends inward from raised edge 430 adjacent to distal edge 408 toward grooved hinge 422. Gap 440 is formed between the proximate handle portion and the distal handle portion.

In embodiments, the proximate handle portion, the distal handle portion, and the gap are covered by flexible handle wrap 442. As illustrated, flexible handle wrap 442 forms a layer extending from the trailing edge as indicated by line 406 of the top surface to the trailing edge of the bottom surface thereby enclosing at least a portion of proximate handle 436, distal handle 432, and gap 440 and includes grooved hinge 422 extending from the trailing edge along a bottom portion of the flexible handle wrap as indicated above. In embodiments, the flexible handle wrap is constrained by raised edge 434 and raised edge 430. In addition, in embodiments, the flexible handle wrap includes a semi-ovate depression as shown that defines gap 440. In embodiments, flexible handle wraps may be manufactured from a thermoplastic elastomer. Thermoplastic elastomers, sometimes referred to as thermoplastic rubbers, are a class of copolymers or a physical mix of polymers that consist of materials with both thermoplastic and elastomeric properties. In some embodiments, the thermoplastic elastomer may include a surface texture to aid in gripping the handle. Surface textures are well-known in the art and one skilled in the art will readily understand the application of a surface texture to increase grip. In addition, handle 452 embodiments may be dimensioned in accordance with intended use. For example, scoop embodiments may be up to 2.50 inches in height without limitation.

Figure 5:
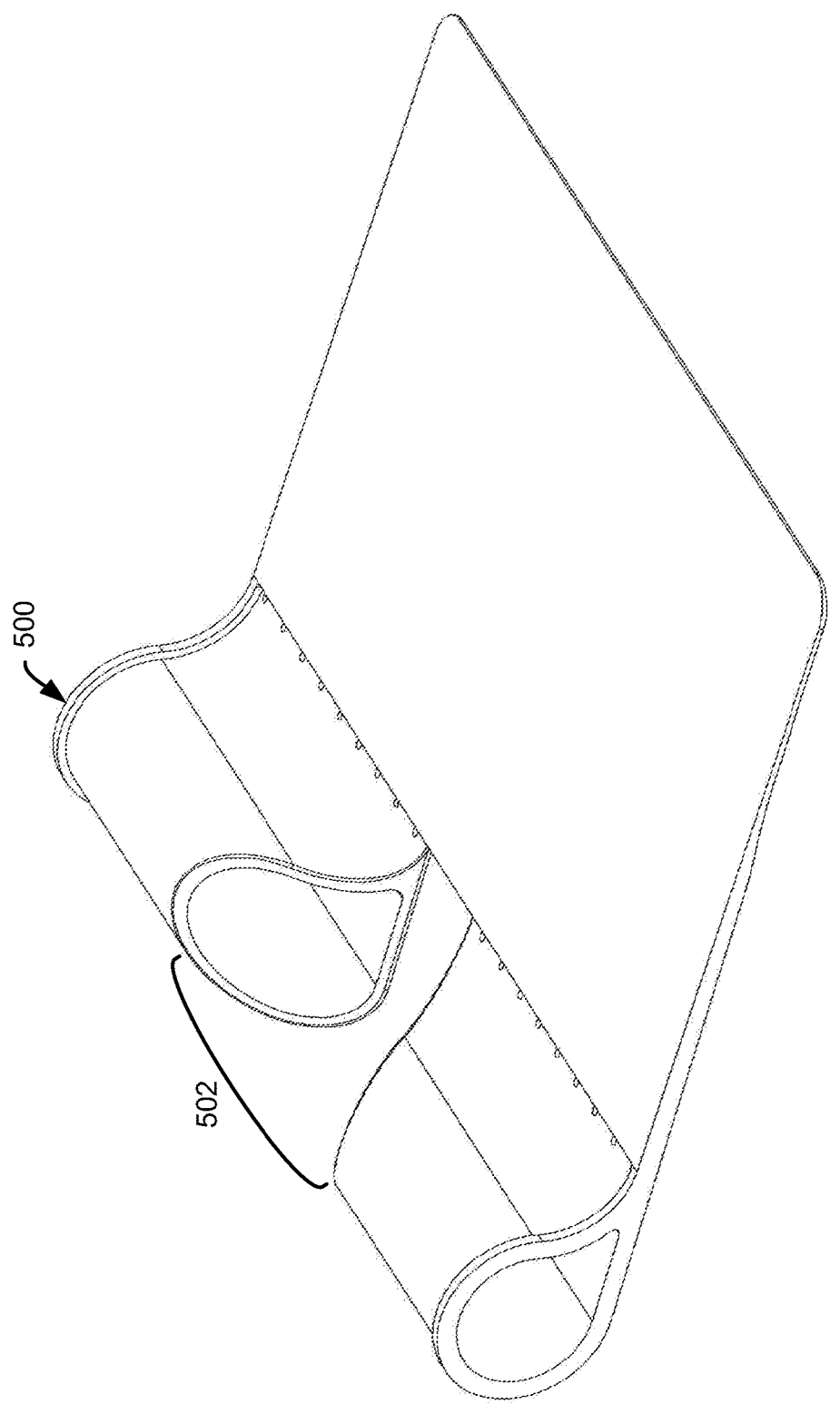
FIG. 5 is an illustrative representation of a scooping device in accordance with embodiments of the present invention.

FIG. 5 is an illustrative representation of scooping device 500 in accordance with embodiments of the present invention. In particular, FIG. 5 illustrates scooping device 500 without flexible handle wrap as illustrated in FIGS. 3A-3C and 4A-4C. As illustrated, scooping device defines gap 502. In embodiments, gap 502 allows the flexible handle wrap to be depressed by a finger or thumb without pinching the finger or thumb. As noted above, flexible handle wrap embodiments include a semi-ovate depression that defines the gap. In this manner, the user is informed of where the gap is located so that depressing the flexible handle wrap at the gap to fold the scooping device is facilitated. In embodiments, the gap may have a width of up to approximately 2.50 inches without limitation.

FIG. 6 is an illustrative representation of scooping devices 600 and 610 in accordance with embodiments of the present invention. In particular, scooping devices include flexible handle cores 602 and 612 respectively in contrast to flexible handle wraps disclosed above for FIGS. 3A-3C and 4A-4C. In embodiments flexible handle cores form a layer along an interior surface of the cavities defined by the proximate and distal handle portions and extend from the proximate edge of the proximate handle portion to the distal edge of the distal handle portion thereby bridging the gap.

FIG. 7 is an illustrative representation of scooping device 700 in accordance with embodiments of the present invention. In particular, FIG. 7 illustrates scooping device 700 in a semi-folded position. As noted above, by folding the scooping device, ingredients may be channeled to the center of the scoop thus directing the ingredients effectively and efficiently into a container or cooking vessel with no need to use a hand or knife. In the illustrated embodiments, grooved hinge 702 is formed along top surface 704. This embodiment is in contrast to the embodiment illustrated for FIGS. 1 and 2 where the grooved hinge is formed along the bottom surface of the scooping device. In some grooved hinge embodiments, the grooved hinge forms a shape such as a vee-groove, a squared groove, and a rounded groove without limitation.

FIG. 8 is an illustrative representation of scooping device 800 in accordance with embodiments of the present invention. In particular, FIG. 8 illustrates scooping device 800 in a flattened position. In this position, the scooping device may be used to gather or scoop ingredients. In a cutting board embodiment, the scooping device may be used to cut on or chop on in the flattened position as disclosed for FIGS. 3A-3C above.

Figures 9, 10:
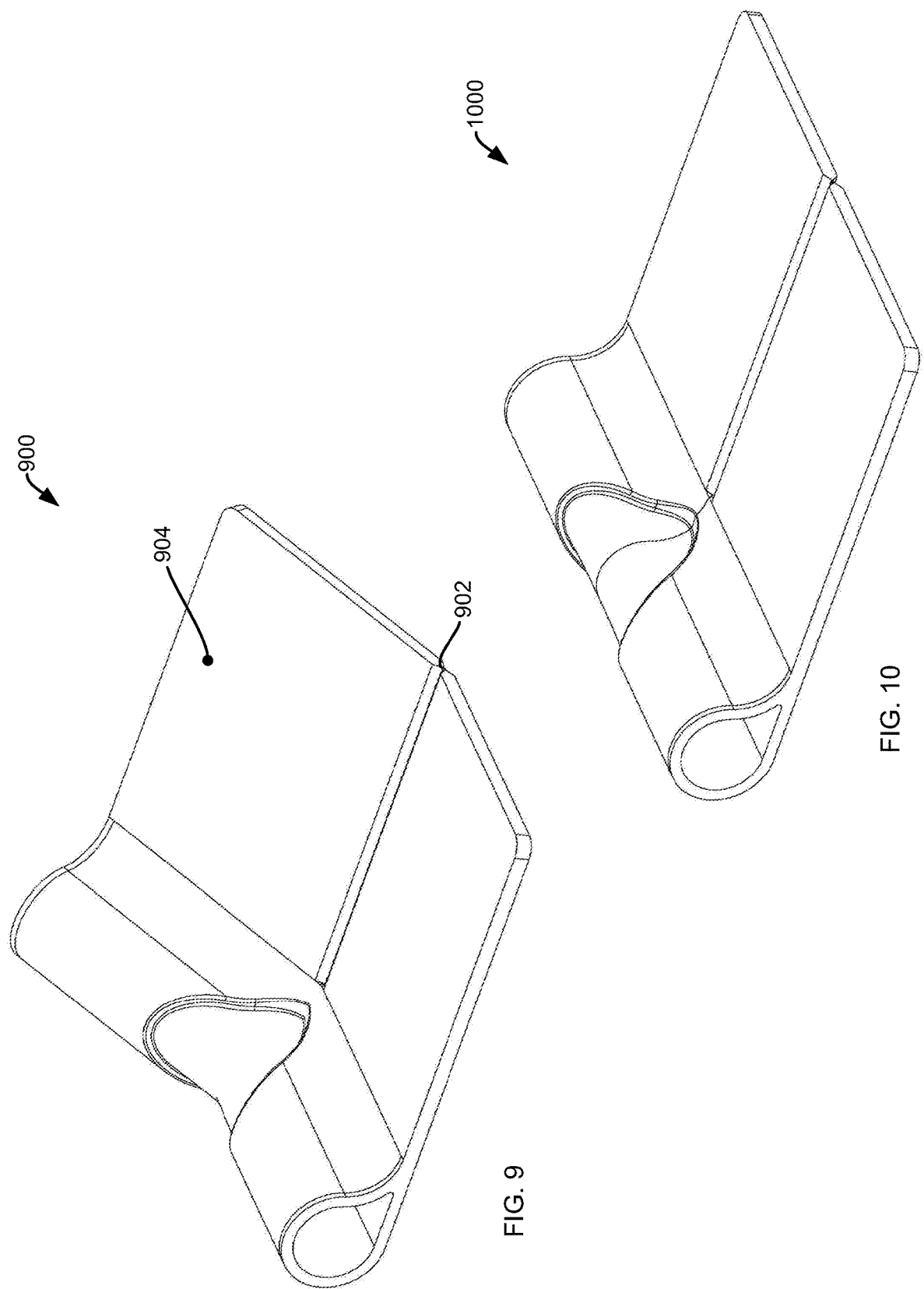
FIG. 9 is an illustrative representation of a scooping device in accordance with embodiments of the present invention.
FIG. 10 is an illustrative representation of a scooping device in accordance with embodiments of the present invention.

FIG. 9 is an illustrative representation of scooping device 900 in accordance with embodiments of the present invention. In particular, FIG. 9 illustrates scooping device 900 in a semi-folded position. As noted above, by folding the scooping device, ingredients may be channeled to the center of the scoop thus directing the ingredients effectively and efficiently into a container or cooking vessel with no need to use a hand or knife. In the illustrated embodiments, grooved hinge 902 is formed along top surface 904 and the bottom surface. This embodiment is in contrast to the embodiment illustrated for FIGS. 1-2 and 7-8 where the grooved hinge is formed along either the bottom surface or the top surface of the scooping device. In some grooved hinge embodiments, the grooved hinge forms a shape such as a vee-groove, a squared groove, and a rounded groove without limitation.

FIG. 10 is an illustrative representation of scooping device 1000 in accordance with embodiments of the present invention. In particular, FIG. 10 illustrates scooping device 1000 in a flattened position. In this position, the scooping device may be used to gather or scoop ingredients. In a cutting board embodiment, the scooping device may be used to cut on or chop on in the flattened position as disclosed for FIGS. 3A-3C above.

Figure 11:
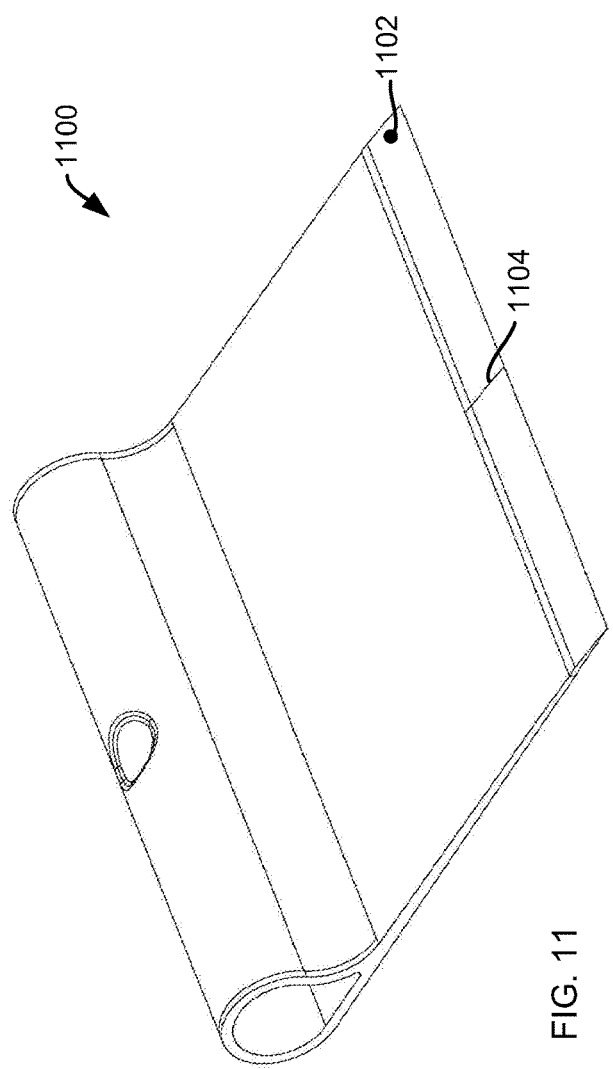
FIG. 11 is an illustrative representation of a scooping device in accordance with embodiments of the present invention.

FIG. 11 is an illustrative representation of scooping device 1100 in accordance with embodiments of the present invention. As illustrated, scooping device 1100 includes metal edge 1102 mechanically bonded with the scoop leading edge. Metal edges may be useful in providing a more rigid edge useful for chopping or separating ingredients. Metal edges may extend as far as the handle in some embodiments. In addition, bonding may occur in any manner known in the art without departing from embodiments disclosed herein and without limitation. In order to allow folding of the scooping device, a break line 1104 may be formed and aligned with the grooved hinge that separates a proximate metal edge portion and a distal metal edge portion. In the illustrated example, the grooved hinge is formed along the bottom surface as illustrated for FIGS. 1 and 2. However, metal edges may be utilized with any grooved hinge embodiment such as those illustrated for FIGS. 7-10.

Figure 12:
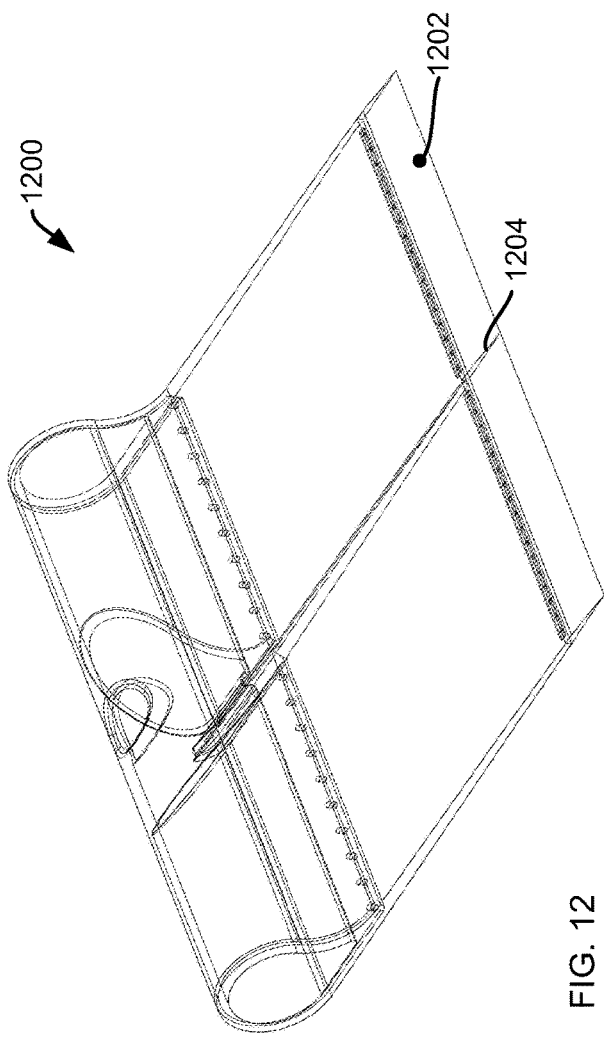
FIG. 12 is an illustrative representation of a scooping device in accordance with embodiments of the present invention.

FIG. 12 is an illustrative representation of scooping device 1200 in accordance with embodiments of the present invention. As illustrated, FIG. 12 shows hidden lines corresponding with the embodiment illustrated for FIG. 11. As illustrated, scooping device 1200 includes metal edge 1202 mechanically bonded with the scoop leading edge. Metal edges may be useful in providing a more rigid edge useful for chopping or separating ingredients. Metal edges may extend as far as the handle in some embodiments. In addition, bonding may occur in any manner known in the art without departing from embodiments disclosed herein and without limitation. In order to allow folding of the scooping device, a break line 1204 may be formed and aligned with the grooved hinge. In the illustrated example, the grooved hinge is formed along the bottom surface as illustrated for FIGS. 1 and 2. However, metal edges may be utilized with any grooved hinge embodiment such as those illustrated for FIGS. 7-10.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such as alterations, permutations, and equivalents as fall within the true spirit and scope of the present invention.

What is claimed is:

1. A scooping device comprising:
    a scoop forming a substantially planar top surface and a bottom surface, the scoop defining a leading edge, a trailing edge, a proximate edge, and a distal edge, wherein the bottom surface includes a first grooved hinge that extends from the leading edge to the trailing edge;
    a proximate handle portion located along the trailing edge, the proximate handle portion forming a first cavity and extending inward from a first raised edge adjacent to the proximate edge;
    a distal handle portion located along the trailing edge, the distal handle portion forming a second cavity and extending inward from a second raised edge adjacent to the distal edge, wherein a gap is formed between the proximate handle portion and the distal handle portion; and
    a flexible handle wrap, the flexible handle wrap forming a layer extending from the trailing edge of the substantially planar top surface to the trailing edge of the bottom surface thereby enclosing at least a portion of the proximate handle, the distal handle, and the gap, wherein the flexible handle wrap further comprises a second grooved hinge extending from the trailing edge along a bottom portion of the flexible handle wrap, the first grooved hinge and the second grooved hinge forming a continuous hinge.

2. The scooping device of claim 1, wherein the bottom surface is tapered from the trailing edge to the leading edge.

3. The scooping device of claim 2, wherein the grooved hinge widens from the leading edge to the trailing edge.

4. The scooping device of claim 1, wherein the first and second grooved hinge form a shape selected from the group consisting of: a vee-groove, a squared groove, and a rounded groove.

5. The scooping device of claim 1, wherein the flexible handle wrap further comprises a textured surface.

6. The scooping device of claim 1, wherein the flexible handle wrap further comprises a semi-ovate depression that defines the gap.

7. The scooping device of claim 1 further comprising:
a metal edge extending from the leading edge, the metal edge including a break line aligned with the first grooved hinge and separating a proximate metal edge portion and a distal metal edge portion.

8. The scooping device of claim 1, wherein the substantially planar top surface includes a third grooved hinge that extends from the leading edge to the trailing edge.

9. A scooping device comprising:
a scoop forming a substantially planar top surface and a bottom surface, the scoop defining a leading edge, a trailing edge, a proximate edge, and a distal edge, wherein the substantially planar top surface includes a first grooved hinge that extends from the leading edge to the trailing edge;
a proximate handle portion located along the trailing edge, the proximate handle portion forming a first cavity and extending inward from a first raised edge adjacent to the proximate edge;
a distal handle portion located along the trailing edge, the distal handle portion forming a second cavity and extending inward from a second raised edge adjacent to the distal edge, wherein a gap is formed between the proximate handle portion and the distal handle portion; and
a flexible handle wrap, the flexible handle wrap forming a layer extending from the trailing edge of the substantially planar top surface to the trailing edge of the bottom surface thereby enclosing at least a portion of the proximate handle, the distal handle, and the gap.

10. The scooping device of claim 9, wherein the flexible handle wrap further comprises a second grooved hinge extending from the trailing edge along a bottom portion of the flexible handle wrap, and wherein the bottom surface includes a third grooved hinge that extends from the leading edge to the trailing edge.

11. A scooping device comprising:
a scoop forming a substantially planar top surface, a bottom surface, a leading edge, a trailing edge, a proximate edge, and a distal edge, wherein the bottom surface includes a grooved hinge that extends from the leading edge to the trailing edge;
a proximate handle portion located along the trailing edge, the proximate handle portion forming a first cavity and extending inward from the proximate edge;
a distal handle portion located along the trailing edge, the distal handle portion forming a second cavity and extending inward from the distal edge wherein a gap is formed between the proximate handle portion and the distal handle portion; and
a flexible handle core, the flexible handle core forming a layer along an interior surface of the first cavity and the second cavity extending from the proximate edge of the proximate handle portion to the distal edge of the distal handle portion thereby bridging the gap.

12. The scooping device of claim 11, wherein the bottom surface is tapered from the trailing edge to the leading edge.

13. The scooping device of claim 12, wherein the grooved hinge widens from the leading edge to the trailing edge.

14. The scooping device of claim 11, wherein the first and second grooved hinge form a shape selected from the group consisting of: a vee-groove, a squared groove, and a rounded groove.

15. The scooping device of claim 11, wherein the flexible handle wrap further comprises a textured surface.

16. The scooping device of claim 11, wherein the flexible handle wrap further comprises a semi-ovate depression that defines the gap.

* * * * *